US012782162B2

(12) United States Patent
Lv

(10) Patent No.: US 12,782,162 B2
(45) Date of Patent: *Nov. 3, 2026

(54) CALIBRATION CONTROL METHOD FOR SPEAKER, APPARATUS, DEVICE, AND READABLE STORAGE MEDIUM

(71) Applicant: GOERTEK INC., Weifang (CN)

(72) Inventor: Tingchang Lv, Weifang (CN)

(73) Assignee: GOERTEK INC., Weifang (CN)

( * ) Notice: Subject to any disclaimer, the term of this patent is extended or adjusted under 35 U.S.C. 154(b) by 299 days.

This patent is subject to a terminal disclaimer.

(21) Appl. No.: 18/635,252

(22) Filed: Apr. 15, 2024

(65) Prior Publication Data

US 2024/0255309 A1 Aug. 1, 2024

Related U.S. Application Data

(63) Continuation of application No. PCT/CN2021/139412, filed on Dec. 18, 2021.

(30) Foreign Application Priority Data

Nov. 23, 2021 (CN) ........................ 202111398508.8

(51) Int. Cl.
*G01C 25/00* (2006.01)
*G01C 21/16* (2006.01)
(Continued)

(52) U.S. Cl.
CPC ........... *G01C 25/005* (2013.01); *G01C 21/16* (2013.01); *H04R 1/323* (2013.01); *H04R 29/001* (2013.01)

(58) Field of Classification Search
CPC ....... G01C 25/005; H04R 1/323; H04R 1/326
See application file for complete search history.

(56) References Cited

U.S. PATENT DOCUMENTS

| | | | |
|---|---|---|---|
| 2019/0056239 | A1 | 2/2019 | Park |
| 2019/0368892 | A1 | 12/2019 | Cook et al. |

FOREIGN PATENT DOCUMENTS

| | | | |
|---|---|---|---|
| CN | 103399175 | A | 11/2013 |
| CN | 105336102 | A | 2/2016 |

(Continued)

OTHER PUBLICATIONS

Yu et al., An Acceleration Sensor Calibration Method and System, Mar. 2017, FIT Machine Translation (Year: 2017).*

(Continued)

*Primary Examiner* — Erika J. Villaluna
(74) *Attorney, Agent, or Firm* — HAUPTMAN HAM, LLP

(57) ABSTRACT

Disclosed are a calibration control method for a speaker, an apparatus, a device, and a readable storage medium. The calibration control method for the speaker includes: obtaining real-time inertial measurement unit (IMU) data of the speaker, and determining whether the speaker is subject to an external force interference according to the real-time IMU data; in response to determining that the speaker is subject to the external force interference, detecting whether an intensity value corresponding to the external force interference is greater than a preset intensity threshold; and in response to the intensity value being greater than the preset intensity threshold, performing a rotation calibration operation on an IMU module in the speaker.

10 Claims, 4 Drawing Sheets

(51) Int. Cl.
*H04R 1/32* (2006.01)
*H04R 29/00* (2006.01)

(56) References Cited

FOREIGN PATENT DOCUMENTS

| | | | | |
|---|---|---|---|---|
| CN | 106546769 A | * | 3/2017 | .............. G01P 21/00 |
| CN | 109579836 A | | 4/2019 | |
| CN | 109791048 A | | 5/2019 | |
| CN | 109959392 A | | 7/2019 | |
| CN | 111189533 A | | 5/2020 | |
| CN | 111712688 A | | 9/2020 | |
| CN | 111895967 A | | 11/2020 | |
| CN | 113063385 A | | 7/2021 | |
| CN | 113490830 A | | 10/2021 | |
| CN | 113551690 A | | 10/2021 | |
| WO | 2012/075463 A1 | | 6/2012 | |

OTHER PUBLICATIONS

Yu et al., An Acceleration Sensor Calibration Method And System (CN 106546769 A), Mar. 2017, Espacenet Machine Translation (Year: 2017).*
First Office Action issued in Chinese Application No. 202111398508.8; mailed Jan. 27, 2024; 15 pgs.
International Search Report and Written Opinion issued in International Application No. PCT/CN2021/139412, mailed Jul. 27, 2022; 11 pgs.
Notification to Grant Patent Right for Invention issue in Chinese Patent Application No. 202111398508.8; mailed May 7, 2024; 5 pgs.
Cui, Hongzhou; "New Method for Train Wheel Diameter Calibration Based on Satellite Positioning"; Railway technological innovation; 2021; 7 pgs.

* cited by examiner

CALIBRATION CONTROL METHOD FOR SPEAKER, APPARATUS, DEVICE, AND READABLE STORAGE MEDIUM

CROSS-REFERENCE TO RELATED APPLICATIONS

This application is a continuation application of International Application No. PCT/CN2021/139412, filed on Dec. 18, 2021, which claims priority to Chinese Patent Application No. 202111398508.8, filed on Nov. 23, 2021. The disclosures of the above-mentioned applications are incorporated herein by reference in their entireties.

TECHNICAL FIELD

The present application relates to the technical field of smart speakers, and in particular to a calibration control method for a speaker, an apparatus, a device, and a readable storage medium.

BACKGROUND

At present, there are more and more smart speaker products with more and more functions, such as on-demand songs, online shopping, or understanding the weather forecast. They can also control smart home device, such as opening curtains, setting the refrigerator temperature, and heating the water heater in advance etc., and these functions generally need to be implemented on the basis of human-computer interaction through voice recognition.

Smart speakers on the present market generally use fixed-position speakers. In home application scenarios, users often shuttle back and forth in their homes frequently, with unstable positions and short and long distances from the smart speakers, so that the speaker is too far away from the user, resulting in inaccurate or unresponsive voice recognition. Therefore, smart speakers need to be equipped with a rotation function to rotate the speaker to the direction facing the user based on the user's voice position. That is, the smart speaker determines the user's position through sound source positioning, and then the smart speaker follows the sound source to rotate to the user's position, thereby improving the voice recognition rate of the smart speaker, responding to the voice information input by the user, and performing the operations indicated by the voice information.

However, the rotation control accuracy of smart speakers is often easily subject to the external force interference. For example, external forces pushing, pressing, and moving the smart speakers can easily cause the rotation control accuracy to decrease. When the smart speaker rotates with the external force, it is likely that there will be rotation deviation, which will reduce the voice recognition rate of the smart speaker and seriously affect the human-computer interaction between the user and the smart speaker.

SUMMARY

The main objective of the present application is to provide a calibration control method for a speaker, an apparatus, a device, and a computer-readable storage medium, aiming to solve the technical problem that the rotation control accuracy of the speaker is easily reduced after being subject to the external force interference.

In order to achieve the above objective, the present application provides a calibration control method for the speaker, which includes the following steps:

obtaining real-time inertial measurement unit (IMU) data of the speaker, and determining whether the speaker is subject to an external force interference according to the real-time IMU data;

in response to determining that the speaker is subject to the external force interference, detecting whether an intensity value corresponding to the external force interference is greater than a preset intensity threshold; and in response to the intensity value being greater than the preset intensity threshold, performing a rotation calibration operation on an IMU module in the speaker.

In an embodiment, the in response to the intensity value being greater than the preset intensity threshold, performing the rotation calibration operation on the IMU module in the speaker further includes:

in response to the intensity value being greater than the preset intensity threshold, and the external force interference being eliminated, detecting an attitude inclination of the speaker and determining whether the attitude inclination is greater than a predetermined inclination safety warning threshold;

in response to the attitude inclination being greater than the inclination safety warning threshold, generating a warning prompt that "the attitude inclination of the speaker is too large"; and in response to the attitude inclination being less than or equal to the inclination safety warning threshold, performing the rotation calibration operation on the IMU module in the speaker.

In an embodiment, the performing the rotation calibration operation on the IMU module in the speaker includes:

determining a calibration starting point and a calibration ending point of the speaker;

controlling the speaker to rotate from the calibration starting point to the calibration ending point, and during a rotation process of the speaker, collecting an actual rotation angle value of the speaker and mapping IMU data corresponding to the actual rotation angle value, the actual rotation angle value is a rotation angle value calculated from the calibration starting point that the speaker that has been rotated; and calibrating the IMU module according to the actual rotation angle value and the mapping IMU data.

In an embodiment, the calibrating the IMU module according to the actual rotation angle value and the mapping IMU data includes:

determining a monitoring rotation angle value corresponding to the actual rotation angle value according to the mapping IMU data;

calculating an angle monitoring error of the IMU module according to the actual rotation angle value and the monitoring rotation angle value; and calibrating the IMU module according to the angle monitoring error.

In an embodiment, the determining the monitoring rotation angle value corresponding to the actual rotation angle value according to the mapping IMU data includes:

determining a monitoring rotation angular velocity corresponding to the actual rotation angle value according to the mapping IMU data; and obtaining a rotation cumulative duration corresponding to the actual rotation angle value, and calculating the monitoring rotation angle value corresponding to the actual rotation angle value according to the monitoring rotation angular velocity and the rotation cumulative duration.

In an embodiment, the controlling the speaker to rotate from the calibration starting point to the calibration ending point, and during the rotation process of the speaker, collecting the actual rotation angle value of the speaker and mapping IMU data corresponding to the actual rotation angle value includes:

controlling the speaker to rotate at a predetermined first rotation angular velocity from the calibration starting point to the calibration ending point, after the speaker rotates to the calibration ending point, updating the calibration ending point to the calibration starting point, and updating the calibration starting point to the calibration ending point;

controlling the speaker to rotate from the updated calibration starting point to the updated calibration ending point at a predetermined second rotation angular velocity, the first rotation angular velocity is greater than the second rotation angular velocity; and during the rotation process of the speaker, collecting the actual rotation angle value and the mapping IMU data corresponding to the actual rotation angle value of the speaker every preset rotation angle.

In an embodiment, a calibration reference point is provided within a rotation angle range between the calibration starting point and the calibration ending point, and an actual rotation angle value of the speaker rotating from the calibration starting point to the calibration reference point is configured to be the reference rotation angle value; and before the collecting the actual rotation angle value of the speaker, the method includes:

based on a proximity sensor in the speaker, detecting whether the speaker is rotated to the calibration reference point; and in response to the speaker being rotated to the calibration reference point, configuring the reference rotation angle value as the actual rotation angle value of the speaker.

In addition, in order to achieve the above objective, the present application further provides a calibration control apparatus for a speaker, including: a collection module, an analysis module, and a calibration module.

The collection module is configured to obtain real-time IMU data of the speaker, and determine whether the speaker is subject to an external force interference according to the real-time IMU data.

The analysis module is configured to in response to determining that the speaker is subject to the external force interference, detect whether an intensity value corresponding to the external force interference is greater than a preset intensity threshold.

The calibration module is configured to in response to the intensity value being greater than the preset intensity threshold, perform a rotation calibration operation on an IMU module in the speaker.

In addition, in order to achieve the above objective, the present application further provides a calibration control device for a speaker, including: a memory, a processor, and a calibration control program stored on the memory and executable on the processor, when the calibration control program is executed by the processor, the above calibration control method for the speaker is implemented.

In addition, in order to achieve the above objective, the present application further provides a computer-readable storage medium. The computer-readable storage medium stores a calibration control program. When the calibration control program is executed by a processor, the above calibration control method for the speaker is implemented.

When the speaker is subject to the external force interference and the corresponding intensity value exceeds the preset intensity threshold, it can be determined that the attitude inclination or position of the speaker is likely to have deviated. However, the deviation of the attitude inclination or position of the speaker will reduce the speaker's IMU module's detection accuracy of the rotation angle, thereby affecting the rotation control accuracy of the speaker. In the present application, the real-time IMU data of the speaker is collected to determine whether the speaker is subject to the external force interference based on the real-time IMU data. If it is determined that the speaker subject to the external force interference, whether the intensity value corresponding to the external force interference is greater than the preset intensity threshold is detected. When the intensity value is greater than the preset intensity threshold, a recalibration operation is performed on the IMU module, thereby ensuring that when the speaker device is subject to external force interference that cause the attitude inclination or position to deviate, the IMU module in the speaker can be recalibrated in time to ensure that the IMU module has good monitoring accuracy for the rotation angle, so that the speaker can still maintain good rotation control accuracy.

BRIEF DESCRIPTION OF THE DRAWINGS

In order to more clearly illustrate the technical solutions in the embodiments of the present application or in the related art, drawings used in the embodiments or in the related art will be briefly described below. Obviously, the drawings in the following description are only some embodiments of the present application. It will be apparent to those skilled in the art that other figures can be obtained according to the structures shown in the drawings without creative work.

Figure 1:
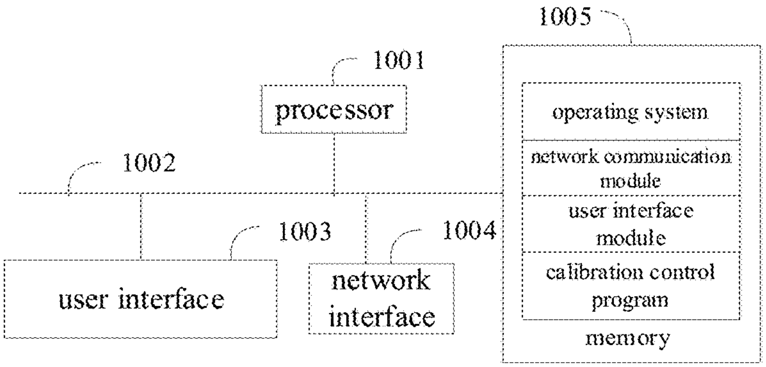
FIG. 1 is a schematic diagram of the terminal\apparatus structure of the hardware operating environment involved in an embodiment of the present application.

The realization of the purpose, functional features and advantages of the present application will be further described with reference to the embodiments and the accompanying drawings.

DETAILED DESCRIPTION OF THE EMBODIMENTS

Exemplary embodiments of the present disclosure will be described in more detail below with reference to the accompanying drawings. Although exemplary embodiments of the present disclosure are shown in the drawings, it should be understood that the disclosure may be embodied in various forms and should not be limited to the embodiments set forth herein. Rather, these embodiments are provided to provide a thorough understanding of the disclosure, and to fully convey the scope of the disclosure to those skilled in the art.

It should be understood that the specific embodiments described here are only used to explain the present application and are not used to limit the present application.

As shown in FIG. 1, FIG. 1 is a schematic diagram of the terminal\apparatus structure of the hardware operating environment involved in an embodiment of the present application.

The terminal in the embodiment of the present application is a calibration control device.

As shown in FIG. 1, the terminal may include: a processor 1001, such as a center processing unit (CPU), a network interface 1004, a user interface 1003, a memory 1005, and a communication bus 1002. The communication bus 1002 is configured to realize connection communication between these components. The user interface 1003 may include a display screen and an input unit such as a keyboard. In an embodiment, the user interface 1003 may also include a standard wired interface and a wireless interface. The network interface 1004 may include a standard wired interface or a wireless interface (such as a wireless fidelity (Wi-Fi) interface). The memory 1005 may be a high-speed random-access memory (RAM) or a stable memory (non-volatile memory (NVM)), such as a disk memory. The memory 1005 may be a storage apparatus independent of the aforementioned processor 1001.

In an embodiment, the terminal may also include a camera, radio frequency (RF) circuit, sensor, audio circuit, Wi-Fi module, etc. The sensors may be such as light sensors, motion sensors and other sensors. In an embodiment, the light sensor may include an ambient light sensor and a proximity sensor. The ambient light sensor can adjust the brightness of the display screen according to the brightness of the ambient light, and the proximity sensor can turn off the display screen and/or the backlight when the terminal device moves to the ear. The terminal device can further be provided with other sensors such as gyroscope, barometer, hygrometer, thermometer, infrared sensor, etc., which will not be described again here.

Those skilled in the art can understand that the terminal structure shown in FIG. 1 does not limit the terminal, and may include more or fewer components than shown, or a combination of certain components, or differently arranged components.

As shown in FIG. 1, memory 1005, which is a computer storage medium, may include an operating system, a network communication module, a user interface module, and a calibration control program.

In the terminal shown in FIG. 1, the network interface 1004 is mainly configured to connect to the backend server and communicate with the backend server. The user interface 1003 is mainly configured to connect to the client (user equipment (UE)) and communicate with the client; and the processor 1001 can be configured to call the calibration control program stored in memory 1005 and perform the following operations:

obtaining real-time inertial measurement unit (IMU) data of the speaker during a rotation calibration process, and determining whether the speaker is subject to an external force interference according to the real-time IMU data;

in response to determining that the speaker is subject to the external force interference, controlling the speaker to abort a rotation calibration operation, and detecting whether an intensity value corresponding to the external force interference is greater than a preset intensity threshold; and in response to the intensity value being greater than the preset intensity threshold, controlling the speaker to restart from a calibration starting point of the speaker to perform the rotation calibration operation on an IMU module in the speaker.

Smart speakers on the present market generally use fixed-position speakers. In home application scenarios, users often shuttle back and forth in their homes frequently, with unstable positions and short and long distances from the smart speakers, so that the speaker is too far away from the user, resulting in inaccurate or unresponsive voice recognition. Therefore, smart speakers need to be equipped with a rotation function to rotate the speaker to the direction facing the user based on the user's voice position. That is, the smart speaker determines the user's position through sound source positioning, and then the smart speaker follows the sound source to rotate to the user's position, thereby improving the voice recognition rate of the smart speaker, realizing intelligent interaction between the users and the smart speaker.

However, the rotation control accuracy of smart speakers is often easily subject to the external force interference. For example, external forces pushing, pressing, and moving the smart speakers can easily cause the rotation control accuracy to decrease. When the smart speaker rotates with the external force, it is likely that there will be rotation deviation, which will reduce the voice recognition rate of the smart speaker and seriously affect the human-computer interaction between the user and the smart speaker.

Regarding the above problem, after repeated testing and experimental research, the present application found that the attitude inclination or position of the speaker changes due to external force, thereby leading to monitoring errors in the IMU module. For example, the three-axis gyroscope in the IMU module will offset due to the changes in attitude inclination, thereby affecting the three-axis gyroscope's detection accuracy for the rotation angle of the speaker. However, the IMU module's monitoring accuracy for the rotation angle of the speaker directly affects the rotation control accuracy of the speaker. In addition, changes in the position of the speaker may also affect the rotation control accuracy of the speaker. When position of the speaker changes, for example, the user moves the speaker to another placement position, or the user pushes the speaker to cause displacement, even if the speaker's attitude inclination does not change, when the speaker rotates following the user through sound source positioning or image positioning, the changed position of the speaker is also likely to interfere with other objects, thereby affecting the rotation function of the speaker.

Figure 2:
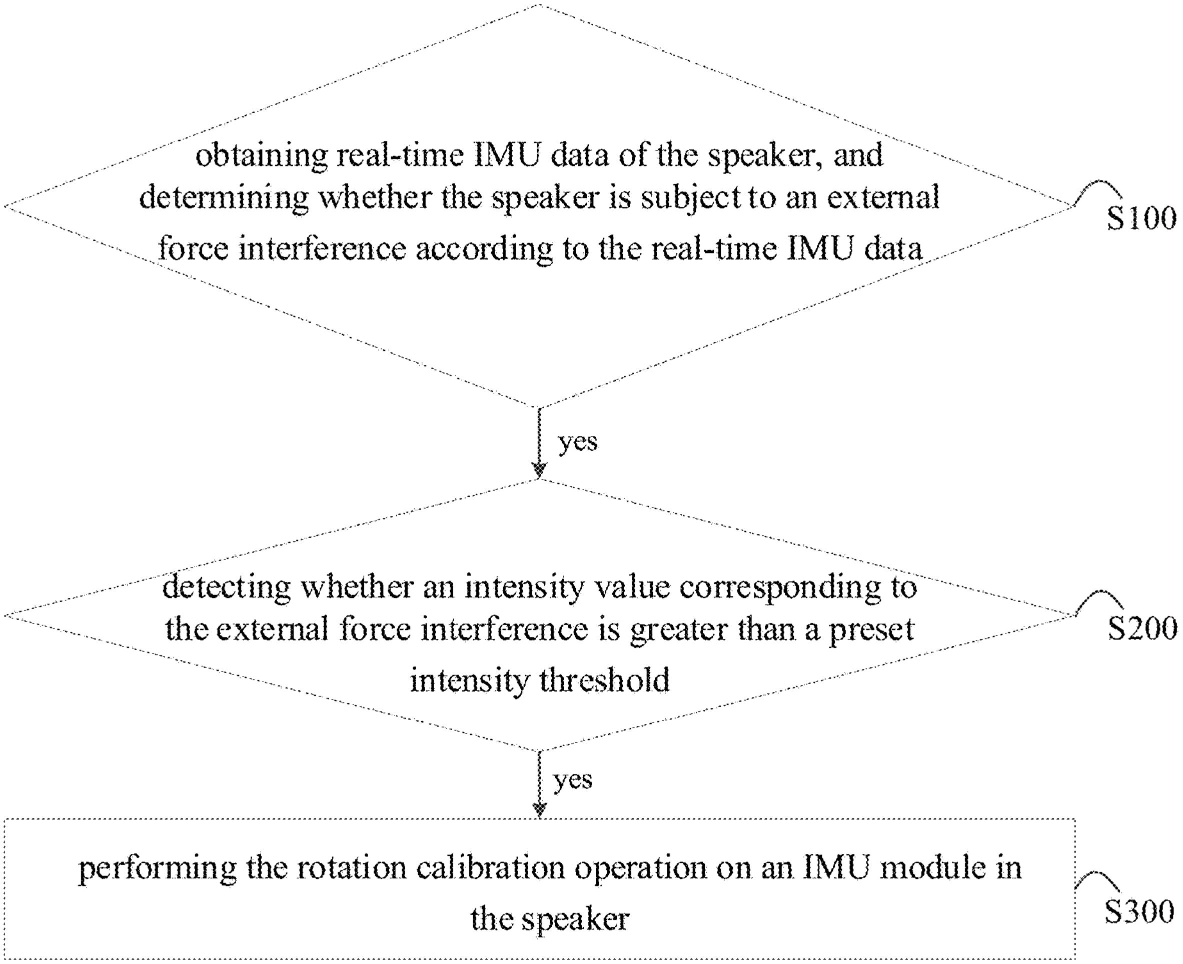
FIG. 2 is a schematic flowchart of a calibration control method for a speaker according to a first embodiment of the present application.

Based on this, as shown in FIG. 2, the present application provides a calibration control method for the speaker. In the first embodiment of the calibration control method for the speaker, the calibration control method for the speaker includes the following steps.

Step S100, obtaining real-time IMU data of the speaker, and determining whether the speaker is subject to an external force interference according to the real-time IMU data.

The real-time IMU data of the speaker can be obtained based on the IMU module in the speaker. The IMU module can include a three-axis gyroscope and a three-axis acceleration sensor. The real-time IMU data is data measured in real time by the acceleration sensor and gyroscope, such as acceleration, angular velocity, and attitude inclination. The attitude inclination represents the inclination angle of the speaker on the vertical plane. Those skilled in the art know that the acceleration sensor can detect whether the acceleration on the three axes changes to determine whether the speaker is subject to the external force interference.

In response to determining that the speaker is subject to the external force interference, step S200 is executed: detecting whether an intensity value corresponding to the external force interference is greater than a preset intensity threshold.

The preset intensity threshold can be set by those skilled in the art according to the actual situation, so as to better detect whether the intensity value changes the position or attitude inclination of the speaker, or to better detect whether the intensity value causes the position or attitude inclination of the speaker to change by more than a certain amount, which is not limited in the embodiments. It can be understood that the intensity value corresponding to the external force interference on the speaker can be calculated by detecting the changes in acceleration on the three axes through the acceleration sensor.

In response to the intensity value being greater than the preset intensity threshold, step S300 is executed: performing the rotation calibration operation on an IMU module in the speaker.

In an embodiment, the rotation calibration operation is to control the speaker to perform a rotation simulation operation. In the rotation simulation operation, the IMU module detects the IMU data of the speaker at each rotation angle value, and implements the calibration on the IMU module according to the IMU data at each rotation angle value.

It should be noted that, when the speaker is subject to the external force interference and the corresponding intensity value exceeds the preset intensity threshold, it can be determined that the attitude inclination or position of the speaker is likely to have deviated. However, the deviation of the attitude inclination or position of the speaker will reduce the speaker's IMU module's detection accuracy of the rotation angle, thereby affecting the rotation control accuracy of the speaker. In the embodiment, when the intensity value is greater than the preset intensity threshold, a recalibration operation is performed on the IMU module, thereby ensuring that when the speaker device is subject to external force interference, the IMU module can be recalibrated in time to ensure that the IMU module has good monitoring accuracy for the rotation angle, so that the speaker can still maintain good rotation control accuracy.

It should be noted that even if the speaker's placement position changes due to external force interference, the present application performs the rotation calibration operation on the IMU module allow the speaker to perform the rotation simulation operation, and pre-verify whether the speaker will interfere with other objects at the current placement during the rotation process, thereby providing an early warning and not affecting the rotation function of the speaker in actual applications, and maintaining good control of the speaker rotation angle by the IMU module. At the same time, even if the speaker's attitude inclination changes due to external force, the present application performs the rotation calibration operation on the IMU module in the speaker to recalibrate the IMU module, and corrects the measurement error of the IMU module to the speaker rotation angle, so that in the application process that the speaker is rotated following the user's movement, the IMU can accurately check the angle value of the current rotation of the speaker, thereby improving the rotation control accuracy of the speaker.

Figure 3:
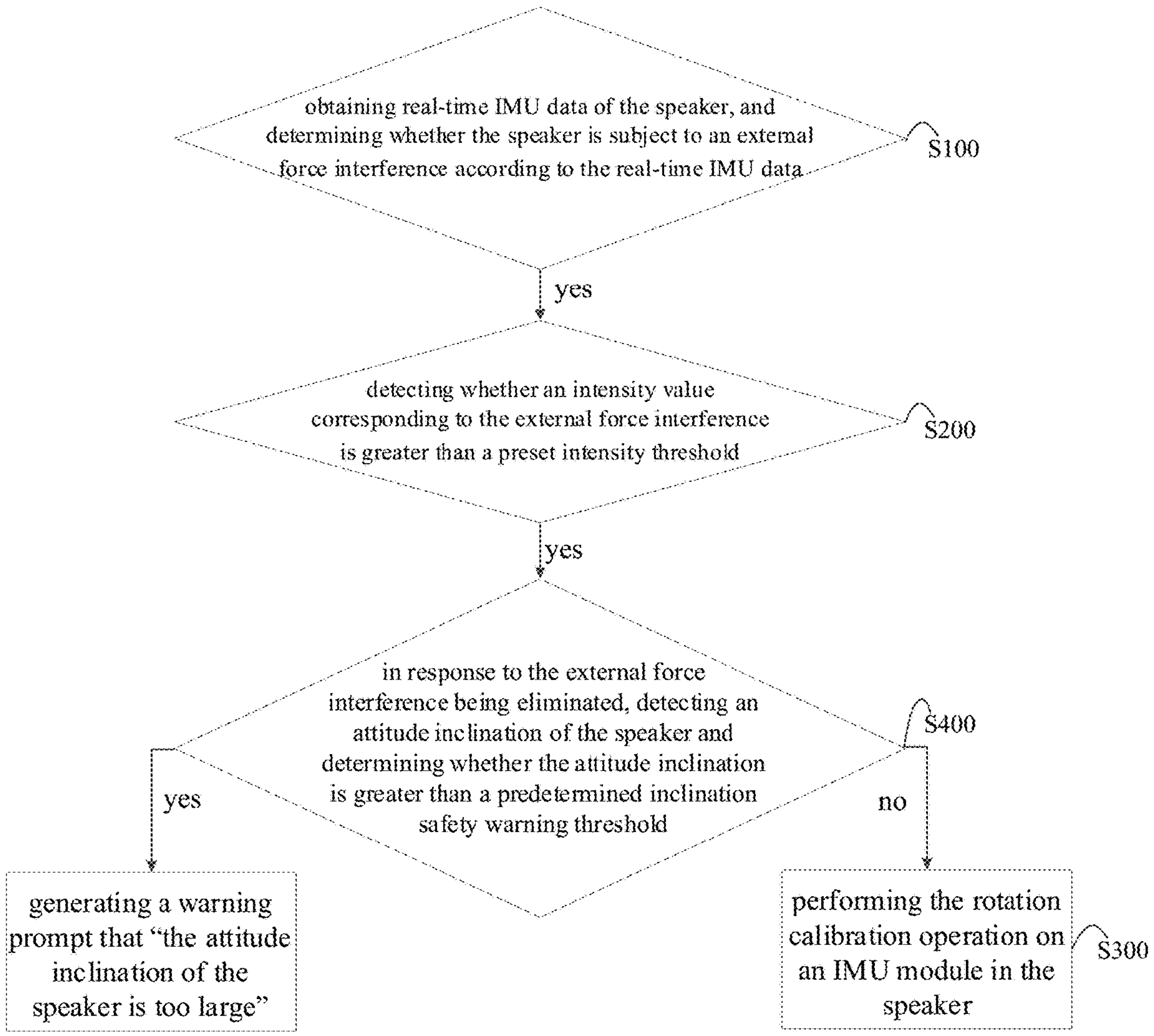
FIG. 3 is a schematic flowchart of the calibration control method for the speaker according to a second embodiment of the present application.

In an embodiment, as shown in FIG. 3, based on the above first embodiment, a second embodiment of the calibration control method for the speaker of the present application is provided. The step S300, before performing the rotation calibration operation on the IMU module in the speaker, the method further includes:

step S400, in response to the external force interference being eliminated, detecting an attitude inclination of the speaker and determining whether the attitude inclination is greater than a predetermined inclination safety warning threshold.

Those skilled in the art can understand that, according to the real-time IMU data collected by the acceleration sensor and gyroscope in the IMU module, it can be determined whether the external interference to the speaker has been eliminated. In addition, the current attitude inclination of the speaker can be detected based on the acceleration sensor. Since external force interference may continue to affect the attitude inclination of the speaker, the embodiment detects the current attitude inclination of the speaker when the external force interference is eliminated, thereby avoiding the inaccurate attitude inclination detection when the external force interference of the speaker is not eliminated.

It should be noted that in the embodiment, an acceleration sensor can be configured to detect the attitude inclination angle of the speaker. The attitude inclination angle represents the inclination angle of the speaker on the vertical plane. Since the acceleration sensor is affected by gravity when placed stationary, there will be a gravitational acceleration of 1*g*. By measuring the component of the gravitational acceleration on the X or Y axis, the inclination angle on the vertical plane can be calculated, and then whether the speaker is placed stably is determined according to the attitude inclination of the speaker.

In an embodiment, in response to the attitude inclination being greater than the inclination safety warning threshold, a warning prompt that "the attitude inclination of the speaker is too large" is generated.

In response to the attitude inclination being less than or equal to the inclination safety warning threshold, then step S300 is executed: performing the rotation calibration operation on the IMU module in the speaker.

The inclination safety warning threshold can be set by those skilled in the art according to the actual situation to better determine whether there is a great dumping risk of the speaker, which is not specifically limited by the embodiment.

Since when an external force acts on the speaker, the placement of the speaker is tilted, and the placement of the speaker is unstable, which may cause the speaker to dump at any time. For example, when the speaker rotates according to the user's orientation in the actual application process, the center of gravity of the speaker loses balance and then the speak rolls over.

The embodiment obtains the current attitude inclination of the speaker to determine whether the speaker is tilted due to external force interference. If the attitude inclination is greater than the inclination safety warning threshold, a warning prompt is generated that "the attitude inclination of the speaker is too large", thereby reminding the user that the current speaker placement is not stable and the current placement attitude of the speaker needs to be re-provided, thus improving the adaptability and robustness of the calibration control method in the embodiment of the present application.

Figure 4:
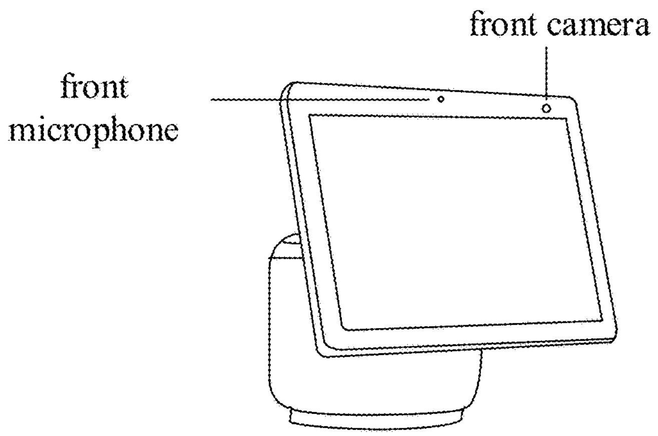
FIG. 4 is a schematic diagram of the hardware structure of the speaker according to the embodiment of the present application.

In an embodiment, as shown in FIG. 4, the speaker of the embodiment includes a front camera, a front microphone, a display, and a speaker host. The front camera and the front microphone are provided on the side where the display screen is located. In the embodiment, after turning on the front microphone, the speaker host can identify the audio signals collected by the microphone, and perform corresponding operations according to the recognized voice information, such as searching, playing audio, etc., thereby conducting voice interaction with the user. In an embodiment, the front camera can be configured to collect video images, and identify whether there is a human body in the video image. When the human body is identified, the front microphone of the smart speaker is turned on, so that the front microphone is turned on when it is determined that there is a need for interaction, thereby saving speaker power consumption. Besides, in addition to determining the user's orientation based on the manner of performing sound source positioning through the front microphone, the user's orientation can also be determined through image positioning. For example, the video image collected by the front camera can be configured to identify the video image and determine whether there is a human body in the video image. If there is a human body in the video image, the human body orientation in the video image is identified, and then the speaker is controlled to rotate to the human body orientation, so as to improve the accuracy of the speaker host's voice recognition of the user.

Figure 5:
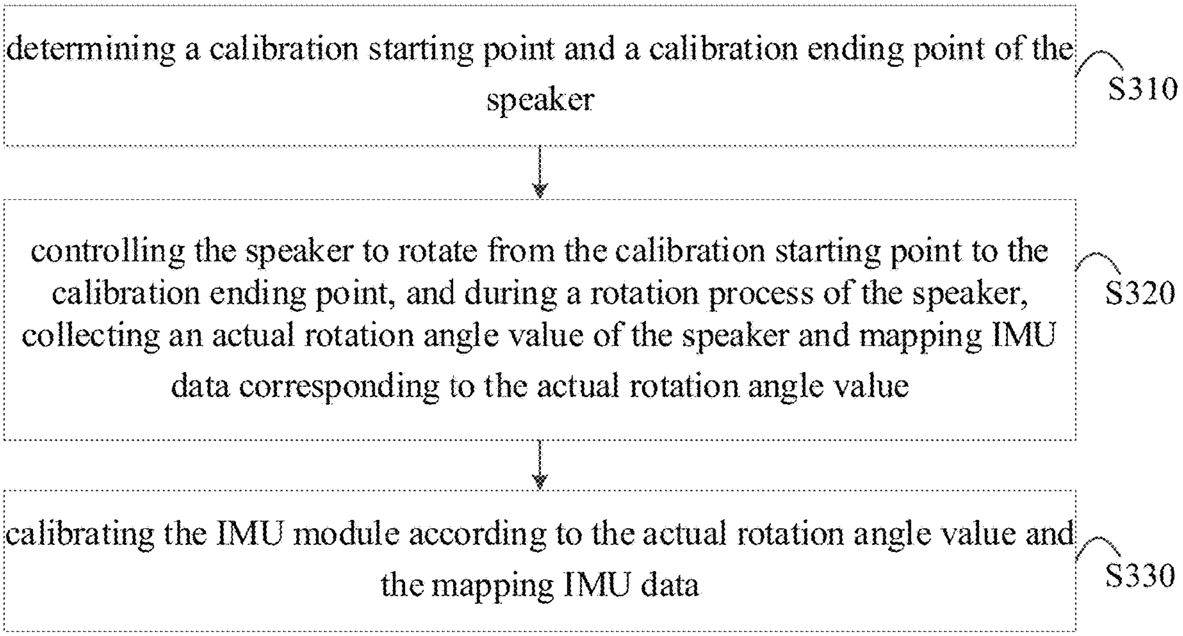
FIG. 5 is a detailed flowchart of the calibration control method for the speaker according to step S300 in a third embodiment of the present application.

In an embodiment, as shown in FIG. 5, based on the above embodiment, a third embodiment of the calibration control method for the speaker of the present application is provided. In the embodiment, the performing the rotation calibration operation on the IMU module in the speaker will be described in detail, the step S300 includes:

step S310, determining a calibration starting point and a calibration ending point of the speaker.

The calibration starting point represents the rotation starting point of the speaker for rotation calibration operation, and the calibration ending point represents the rotation ending point of the speaker for rotation calibration operation. The calibration starting point and the calibration ending point can be preset by those skilled in the art before the speaker is put on the market, or the user can customize the settings after the speaker is put on the market.

Step S320, controlling the speaker to rotate from the calibration starting point to the calibration ending point, and during a rotation process of the speaker, collecting an actual rotation angle value of the speaker and mapping IMU data corresponding to the actual rotation angle value.

The actual rotation angle value is a rotation angle value calculated from the calibration starting point that the speaker that has been rotated. In addition, the mapping IMU data represents the IMU data measured by the gyroscope and acceleration sensor when the speaker rotates to different actual rotation angle values. The mapping IMU data may include the rotation angular velocity of the speaker, and the integral of the rotation angular velocity over time, etc.

Step S330, calibrating the IMU module according to the actual rotation angle value and the mapping IMU data.

The angular velocity and acceleration in the mapping IMU data can be fitted using the least square algorithm to calculate the monitoring rotation angle value, and the actual rotation angle value can be compared with the monitoring rotation angle value to obtain the offset scale of the gyroscope, and then the gyroscope in the IMU module is calibrated.

The embodiment of the present application controls the speaker to restart from the calibration starting point of the speaker to rotate to a calibration ending point of the speaker, and during a rotation process of the speaker, collects the actual rotation angle value of the speaker and mapping IMU data corresponding to the actual rotation angle value, thereby calibrating the gyroscope's offset scale according to the actual rotation angle value and the mapping IMU data.

In an embodiment, before the step of collecting the actual rotation angle value of the speaker, the method includes:

step a, during the rotation process of the speaker, counting the pulse data output by the motor in the speaker, and determining the actual rotation angle value of the speaker according to the quantity of pulse data.

Figure 6:
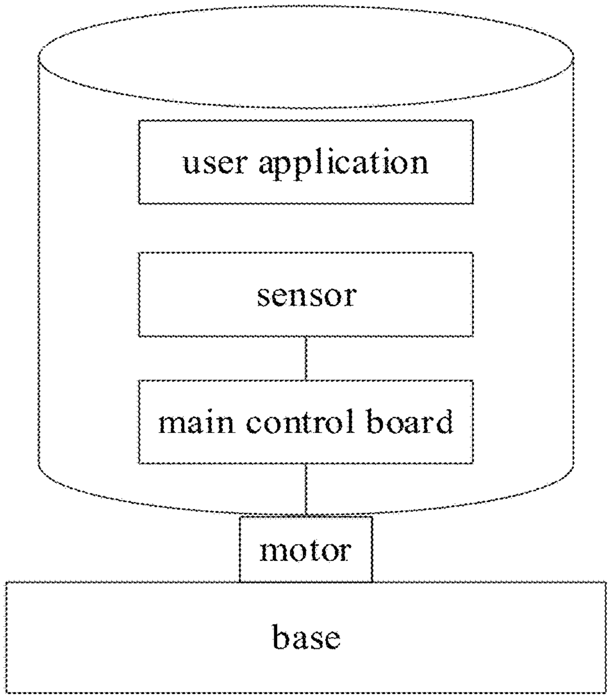
FIG. 6 is a schematic diagram of the module structure of the speaker according to the embodiment of the present application.

As shown in FIG. 6, the motor is a rotary motor, which is configured to drive the speaker to rotate to realize the rotation control function of the speaker. The user application can represent intelligent service applications such as on-demand songs, online shopping, or understanding weather forecasts, and the functions of these user applications are realized on the basis of human-computer interaction through voice recognition. The sensor may include a three-axis acceleration sensor and a three-axis gyroscope in the IMU module. In addition, the main control board is electrically connected to the sensor and the motor respectively. The main control board receives the actual rotation angle value of the motor and the IMU data of the sensor to achieve calibration of the rotation control accuracy of the speaker.

Those skilled in the art can understand that the actual rotation angle value of the speaker can be calculated based on a certain preset algorithm and the quantity of the pulse data. For example, if the rotation angle corresponding to outputting one pulse data is 0.5 degrees, then when the motor outputs 50 pulse data, the corresponding actual rotation angle value can be calculated to be 25 degrees.

In another embodiment, before the step of collecting the actual rotation angle value of the speaker, the method includes:

step b, during the rotation process of the speaker, counting the motor rotation time of the motor in the speaker, and determining the actual rotation angle value of the speaker according to the motor rotation time.

Those skilled in the art can understand that the actual rotation angle value of the speaker can be calculated based on a certain preset algorithm and the motor rotation time. For example, if the motor rotates for 1 second and the corresponding rotation angle is 3 degrees, then when the motor rotates for 10 seconds, the corresponding actual rotation angle value can be calculated to be 30 degrees.

In an embodiment, a calibration reference point is provided within the rotation angle range between the calibration starting point and the calibration ending point, and the actual rotation angle value of the speaker rotating from the calibration starting point to the calibration reference point is configured to be the reference rotation angle value; and before the step of collecting the actual rotation angle value of the speaker, the method includes:

step c, based on the proximity sensor in the speaker, detecting whether the speaker is rotated to the calibration reference point.

It should be noted that the calibration reference point is preset by those skilled in the art at a position between the calibration starting point and the calibration ending point, and the actual rotation angle value of the speaker rotating from the calibration starting point to the calibration reference point is configured to be the reference rotation angle value. The reference rotation angle value is stored in the speaker system, so that when the speaker performs subsequent rotation calibration operations, the reference rotation angle value can be retrieved to calibrate the IMU module. The reference rotation angle value may be 90 degrees, 180 degrees, or 210 degrees, etc.

Step d, in response to the speaker being rotated to the calibration reference point, configuring the reference rotation angle value as the actual rotation angle value of the speaker.

In order to help understand the embodiments of the present application, a specific embodiment is enumerated. In an embodiment, when the speaker rotates to the calibration reference point during the rotation calibration operation, the calibration prestored in the speaker system is retrieved. The reference rotation angle value corresponding to the reference point is “180 degrees”, that is, the actual rotation angle value of the current speaker is 180 degrees. It should be noted that the specific embodiment does not constitute a limitation of the present application, and more transformations based on this also belong to the protection scope of the present application. For example, in an embodiment, a plurality of calibration reference points can be provided within the rotation angle range between the calibration starting point and the calibration ending point, such as 4 calibration reference points. The reference rotation angle value corresponding to the first calibration reference point is 60 degrees, the reference rotation angle value corresponding to the second calibration reference point is 120 degrees, the reference rotation angle value corresponding to the third calibration reference point is 180 degrees, and the reference rotation angle value corresponding to the fourth calibration reference point is 240 degrees. Thus, during one rotation of the speaker, the IMU module can be calibrated based on the positions of the plurality of calibration reference points, thereby improving the calibration accuracy and the calibration efficiency of the IMU module.

In the embodiment, when the speaker passes the calibration reference point, the speaker can determine the actual rotation angle value currently rotated, calibrate the IMU module according to the actual rotation angle value, and correct the IMU module’s monitoring error of the speaker rotation angle, so that the IMU module can accurately monitor the angle value of the current rotation angle value of the speaker during the actual application, thereby improving the rotation control accuracy of the speaker.

In an embodiment, the step S320, controlling the speaker to restart from the calibration starting point of the speaker to rotate to a calibration ending point of the speaker, and during a rotation process of the speaker, collecting an actual rotation angle value of the speaker and mapping IMU data corresponding to the actual rotation angle value includes:

step e, controlling the speaker to rotate at a predetermined first rotation angular velocity from the calibration starting point to the calibration ending point, after the speaker rotates to the calibration ending point, updating the calibration ending point to the calibration starting point, and updating the calibration starting point to the calibration ending point.

Step f, controlling the speaker to rotate from the updated calibration starting point to the updated calibration ending point at a predetermined second rotation angular velocity.

The first rotation angular velocity is greater than the second rotation angular velocity.

Step g, during the rotation process of the speaker, collecting the actual rotation angle value and the mapping IMU data corresponding to the actual rotation angle value of the speaker every preset rotation angle.

That is, in the embodiment, the speaker rotates once clockwise and counterclockwise respectively. One of the rotation directions is the IMU calibration for the high-speed rotation motion model, and another rotation direction is the IMU calibration for the low-speed rotation motion model.

In order to help understand the embodiments of the present application, a specific example is enumerated. When the speaker rotates clockwise, a high-speed rotation 0 to 360 degree speaker calibration model is established, and the speaker is controlled to rotate clockwise at a speed of 0.5 m/s, and the mapping IMU data is collected every 5 degrees. The mapping IMU data can include 3-axis gravity acceleration data and measured values of rotation angular velocity corresponding to different actual rotation angle values. When the speaker rotates to 360 degrees, the speaker is controlled to stop rotating and begins to rotate counterclockwise from the current position, that is, the current calibration ending point is updated to the calibration starting point, the calibration starting point is updated to the calibration ending point. The low-speed rotation 0 to 360 degree speaker calibration model is established, the speaker is controlled to rotate counterclockwise at a speed of 0.2 m/s, and the mapping IMU data is also collected every 5 degrees. That is, in the embodiment, the actual rotation angle value corresponding to the calibration starting point is 0 degrees, the actual rotation angle value corresponding to the calibration ending point is 360 degrees, and the preset rotation angle is 10 degrees, the first rotation angular velocity is 0.5 m/s, the second rotation angular velocity is 0.2 m/s. It should be noted that the specific embodiment does not constitute a limitation of the present application. More forms of transformation based on this also belong to the protection scope of the present application. For example, in an embodiment, the actual rotation angle value corresponding to the calibration starting point is 0 degrees, the actual rotation angle value corresponding to the calibration ending point is 355 degrees, the preset rotation angle is 5 degrees, the first rotation angular velocity is 0.6 m/s, and the second rotation angular velocity is 0.3 m/s. In an embodiment, the actual rotation angle value corresponding to the calibration starting point is 0 degrees, the actual rotation angle value corresponding to the calibration ending point is 350 degrees, the preset rotation angle is 5 degrees, and the first rotation angular velocity is 0.8 m/s, the second rotation angular velocity is 0.5 m/s.

In an embodiment, step S320, controlling the speaker to restart from the calibration starting point of the speaker to rotate to a calibration ending point of the speaker, and during a rotation process of the speaker, collecting an actual rotation angle value of the speaker and mapping IMU data corresponding to the actual rotation angle value, further includes:

step h, controlling the speaker to rotate at a predetermined third rotation angular velocity from the calibration starting point to the calibration ending point, after the speaker rotates to the calibration ending point, updating the calibration ending point to the calibration starting point, and updating the calibration starting point to the calibration ending point.

Step i, controlling the speaker to rotate at a predetermined third rotation angular velocity from the updated calibration starting point to the updated calibration ending point, after the speaker rotates to the updated calibration ending point, updating the calibration ending point to the calibration starting point again, and updating the calibration starting point to the calibration ending point.

Step j, controlling the speaker to rotate at a predetermined fourth rotation angular velocity from the updated calibration starting point to the updated calibration ending point, after the speaker rotates to the updated calibration ending point, updating the calibration ending point to the calibration starting point again, and updating the calibration starting point to the calibration ending point, the third rotation angular velocity is greater than the fourth rotation angular velocity.

Step k, controlling the speaker to rotate from the updated calibration starting point to the updated calibration ending point at a predetermined fourth rotation angular velocity.

Step l, during the rotation process of the speaker, collecting the actual rotation angle value and the mapping IMU data corresponding to the actual rotation angle value of the speaker every preset rotation angle.

In an embodiment, the speaker rotates twice clockwise and counterclockwise respectively. One clockwise and counterclockwise rotation is the IMU calibration for the high-speed rotation motion model, and another clockwise and counterclockwise rotation is the IMU calibration for the low-speed rotation motion model.

In actual applications, due to the different speeds or orientations of the users walking in the room, there are also specific application scenarios with different rotation speeds and directions of rotation when the speakers rotate following the users. In order to enable the speaker to adapt to the rotation control of different rotation speeds and different rotation directions during the actual application process of following the user to rotate, it is also necessary to improve the rotation control accuracy of the speaker for different rotation speeds and different rotation directions. In an embodiment, during the rotation calibration operation process, a plurality of calibration mechanisms with different rotation calibration directions and rotation calibration speeds are provided to calibrate the rotation control accuracy of the speakers at different rotation speed levels and different rotation direction levels, further improving the rotation control accuracy of the speakers.

Figure 7:
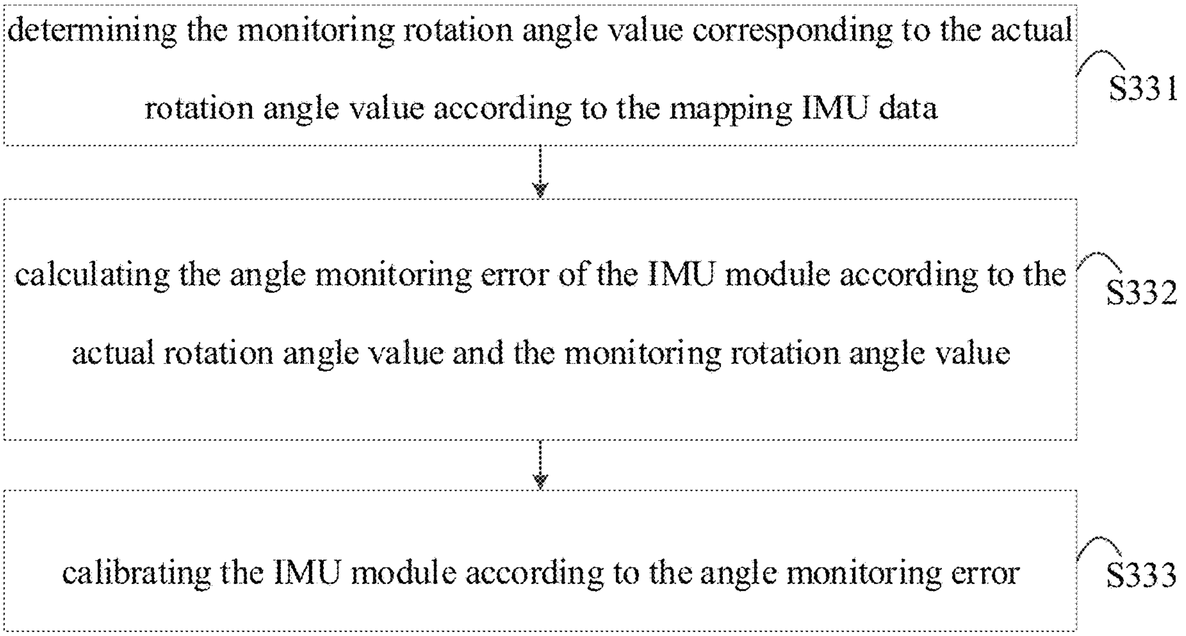
FIG. 7 is a detailed flowchart of the calibration control method for the speaker according to step S330 in a fourth embodiment of the present application.
Figure 8:
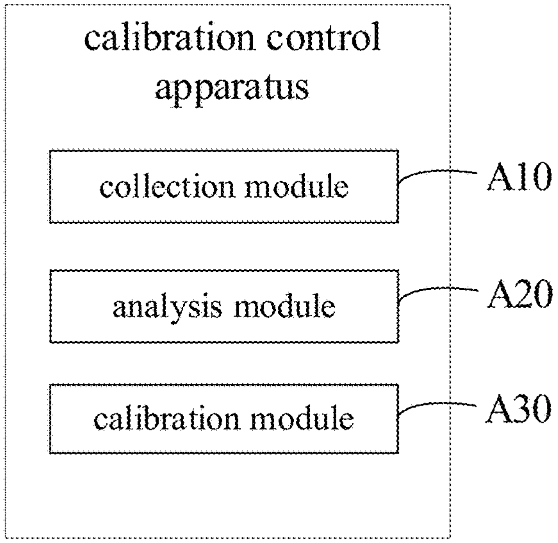
FIG. 8 is a schematic diagram of the apparatus structure of the speaker according to the embodiment of the present application.

Furthermore, as shown in FIG. 7, based on the second embodiment, a fourth embodiment of the calibration control method for the speaker of the present application is provided. In the embodiment, according to the actual rotation angle value and the mapping IMU data, the steps for calibrating the IMU module are described in detail, and the step S330 includes:

step S331, determining the monitoring rotation angle value corresponding to the actual rotation angle value according to the mapping IMU data.

Those skilled in the art can understand that the mapping IMU data may include the acceleration detected by the acceleration sensor, the rotation angular velocity detected by the gyroscope, and the integral of the rotation angular velocity over time.

In an embodiment, the step of determining the monitoring rotation angle value corresponding to the actual rotation angle value according to the mapping IMU data includes:

step n, determining the monitoring rotation angular velocity corresponding to the actual rotation angle value according to the mapping IMU data; and step m, obtaining a rotation cumulative duration corresponding to the actual rotation angle value, and calculating the monitoring rotation angle value corresponding to the actual rotation angle value according to the monitoring rotation angular velocity and the rotation cumulative duration.

In an embodiment, the solution formula for the monitoring rotation angle value can be:

$$\theta(t+\Delta t)=\theta(t)+w(\theta)\omega\Delta t;$$

$\theta(t+\Delta t)$ is the monitoring rotation angle value, $\theta(t)$ is the actual rotation angle value corresponding to the calibration starting point. The actual rotation angle value corresponding to the calibration starting point is generally 0 degrees. $w(\theta)$ is the monitoring rotation angular velocity, $\omega\Delta t$ is the rotation cumulative duration corresponding to the actual rotation angle value.

It can be understood that $w(\theta)\omega\Delta t$ is the integral of the monitoring rotation angle value over the rotation time, that is, the current monitoring rotation angle value of the speaker is the integral of the monitoring rotation angular velocity over the rotation time.

In the embodiment, the IMU module is pre-rotated to each actual rotation angle value, and the angular velocity sum corresponding to each actual rotation angle value and the integral of the angular velocity over the time are measured through the IMU module, thereby calculating the monitoring rotation angle value. It is convenient to subsequently compare the monitored rotation angle value with the actual rotation angle value, and then determine whether there is a monitoring error in the IMU module. If there is the monitoring error in the IMU module, the IMU module is calibrated according to the deviation angle value between the monitoring rotation angle value and the actual rotation angle value.

Step S332, calculating the angle monitoring error of the IMU module according to the actual rotation angle value and the monitoring rotation angle value.

In an embodiment, the calculated monitoring rotation angle value is 182.30 degrees, and the actual rotation angle value is 180.00 degrees, which indicates that there is an error in the rotation control accuracy of the speaker. The angle monitoring error is 2.3 degrees at this time. The IMU module can be recalibrated according to the angle monitoring error of 2.3 degrees.

Step S333, calibrating the IMU module according to the angle monitoring error.

In the embodiment, the deviation parameter between the actual rotation angle value and the monitoring rotation angle value are used to correct the drift error of the gyroscope in the IMU module caused by external force interference, thereby correcting the measurement error of the speaker rotation angle by the IMU module. In the actual application process of making the speaker rotate following the user's movement, the IMU can accurately check the angle value of the current rotation of the speaker, thereby improving the rotation control accuracy of the speaker.

In addition, as shown in FIG. 3, an embodiment of the present application further provides a calibration control apparatus for a speaker, including: a collection module, an analysis module, and a calibration module.

The collection module A10 is configured to obtain real-time IMU data of the speaker, and determine whether the speaker is subject to an external force interference according to the real-time IMU data.

The analysis module A20 is configured to in response to determining that the speaker is subject to the external force interference, detect whether an intensity value corresponding to the external force interference is greater than a preset intensity threshold.

The calibration module A30 is configured to in response to the intensity value being greater than the preset intensity threshold, perform the rotation calibration operation on the IMU module in the speaker.

In an embodiment, the analysis module A20 is further configured to:

- in response to the intensity value being greater than the preset intensity threshold, and the external force interference being eliminated, detect an attitude inclination of the speaker and determine whether the attitude inclination is greater than a predetermined inclination safety warning threshold;
- in response to the attitude inclination being greater than the inclination safety warning threshold, generate a warning prompt that "the attitude inclination of the speaker is too large"; and
- in response to the attitude inclination being less than or equal to the inclination safety warning threshold, perform the rotation calibration operation on the IMU module in the speaker.

In an embodiment, the calibration module A30 is further configured to:

- determine a calibration starting point and a calibration ending point of the speaker;
- control the speaker to rotate from the calibration starting point to the calibration ending point, and during a rotation process of the speaker, collect an actual rotation angle value of the speaker and mapping IMU data corresponding to the actual rotation angle value, the actual rotation angle value is a rotation angle value calculated from the calibration starting point that the speaker that has been rotated; and
- calibrate the IMU module according to the actual rotation angle value and the mapping IMU data.

In an embodiment, the calibration module A30 is further configured to:

- determine a monitoring rotation angle value corresponding to the actual rotation angle value according to the mapping IMU data;
- calculate an angle monitoring error of the IMU module according to the actual rotation angle value and the monitoring rotation angle value; and
- calibrate the IMU module according to the angle monitoring error.

In an embodiment, the calibration module A30 is further configured to:

- determine a monitoring rotation angular velocity corresponding to the actual rotation angle value according to the mapping IMU data; and
- obtain a rotation cumulative duration corresponding to the actual rotation angle value, and calculate the monitoring rotation angle value corresponding to the actual rotation angle value according to the monitoring rotation angular velocity and the rotation cumulative duration.

In an embodiment, the calibration module A30 is further configured to:

- control the speaker to rotate at a predetermined first rotation angular velocity from the calibration starting point to the calibration ending point, after the speaker rotates to the calibration ending point, update the calibration ending point to the calibration starting point, and update the calibration starting point to the calibration ending point;
- control the speaker to rotate from the updated calibration starting point to the updated calibration ending point at a predetermined second rotation angular velocity, the first rotation angular velocity is greater than the second rotation angular velocity; and
- during the rotation process of the speaker, collect the actual rotation angle value and the mapping IMU data corresponding to the actual rotation angle value of the speaker every preset rotation angle.

In an embodiment, a calibration reference point is provided within a rotation angle range between the calibration starting point and the calibration ending point, and an actual rotation angle value of the speaker rotating from the calibration starting point to the calibration reference point is configured to be the reference rotation angle value; and the calibration module A30 is further configured to:

- based on a proximity sensor in the speaker, detect whether the speaker is rotated to the calibration reference point; and
- in response to the speaker being rotated to the calibration reference point, configure the reference rotation angle value as the actual rotation angle value of the speaker. Each functional module of the calibration control apparatus may be referred to the various embodiments of the calibration control method for the speaker of the present application, and will not be described again here.

In addition, the present application further provides a calibration control device for the speaker, including: a memory, a processor, and a calibration control program stored on the memory. The processor is configured to execute the calibration control program to implement the steps according to each embodiment of the above calibration control method for the speaker.

The present application further provides a readable storage medium that stores one or more programs. The one or more programs can further be executed by one or more processors to implement the above-mentioned steps according to each embodiment of the calibration control method for the speaker.

For various embodiments of the mode control apparatus and computer-readable storage medium of the Bluetooth headset of the present application, reference can be made to the various embodiments of the calibration control method for the speaker of the present application, which will not be repeated here.

It should be noted that, in this document, the terms "comprising", "comprises" or any other variations thereof are intended to cover a non-exclusive inclusion, such that a process, method, article or system that includes a series of elements not only includes those elements, it also includes other elements not expressly listed or inherent in the process, method, article or system. Without further limitation, an element defined by the statement "comprises a . . . " does not exclude the presence of additional identical elements in a process, method, article or system that includes that element.

The above serial numbers of the embodiments of the present application are only for description and do not represent the advantages and disadvantages of the embodiments.

Through the above description of the embodiments, those skilled in the art can clearly understand that the methods of the above embodiments can be implemented by means of software plus the necessary general hardware platform. Of course, it can also be implemented by hardware, but in many cases the former is better implementation. Based on this understanding, the technical solution of the present application can be embodied in the form of a software product in essence or the part that contributes to the existing technology. The computer software product is stored in a storage medium (such as read-only memory (ROM)/RAM, disk, compact disc (CD)), including several instructions to cause a terminal device (which can be a mobile phone, computer, server, air conditioner, or network device, etc.) to execute the methods described in various embodiments of the present application.

The above are only some embodiments of the present application, and intended to limit the scope of the present application. Any equivalent structural or process transformations made according to the description and drawings of the present application, or direct/indirect application in other related technical fields are included in the scope of the present application.

What is claimed is:

1. A calibration control method for a speaker, comprising:

obtaining real-time inertial measurement unit (IMU) data of the speaker, and determining whether the speaker is subject to an external force interference according to the real-time IMU data;

in response to determining that the speaker is subject to the external force interference, detecting whether an intensity value corresponding to the external force interference is greater than a preset intensity threshold; and in response to the intensity value being greater than the preset intensity threshold, performing a rotation calibration operation on an IMU module in the speaker.

2. The calibration control method for the speaker according to claim 1, wherein the in response to the intensity value being greater than the preset intensity threshold, performing the rotation calibration operation on the IMU module in the speaker further comprises:

in response to the intensity value being greater than the preset intensity threshold, and the external force interference being eliminated, detecting an attitude inclination of the speaker and determining whether the attitude inclination is greater than a predetermined inclination safety warning threshold;

in response to the attitude inclination being greater than the inclination safety warning threshold, generating a warning prompt that "the attitude inclination of the speaker is too large"; and in response to the attitude inclination being less than or equal to the inclination safety warning threshold, performing the rotation calibration operation on the IMU module in the speaker.

3. The calibration control method for the speaker according to claim 1, wherein the performing the rotation calibration operation on the IMU module in the speaker comprises:

determining a calibration starting point and a calibration ending point of the speaker;

controlling the speaker to rotate from the calibration starting point to the calibration ending point, and during a rotation process of the speaker, collecting an actual rotation angle value of the speaker and mapping IMU data corresponding to the actual rotation angle value, wherein the actual rotation angle value is a rotation angle value calculated from the calibration starting point that the speaker that has been rotated; and calibrating the IMU module according to the actual rotation angle value and the mapping IMU data.

4. The calibration control method for the speaker according to claim 3, wherein the calibrating the IMU module according to the actual rotation angle value and the mapping IMU data comprises:

determining a monitoring rotation angle value corresponding to the actual rotation angle value according to the mapping IMU data;

calculating an angle monitoring error of the IMU module according to the actual rotation angle value and the monitoring rotation angle value; and calibrating the IMU module according to the angle monitoring error.

5. The calibration control method for the speaker according to claim 4, wherein the determining the monitoring rotation angle value corresponding to the actual rotation angle value according to the mapping IMU data comprises:

determining a monitoring rotation angular velocity corresponding to the actual rotation angle value according to the mapping IMU data; and obtaining a rotation cumulative duration corresponding to the actual rotation angle value, and calculating the monitoring rotation angle value corresponding to the actual rotation angle value according to the monitoring rotation angular velocity and the rotation cumulative duration.

6. The calibration control method for the speaker according to claim 3, wherein the controlling the speaker to rotate from the calibration starting point to the calibration ending point, and during the rotation process of the speaker, collecting the actual rotation angle value of the speaker and mapping IMU data corresponding to the actual rotation angle value comprises:

controlling the speaker to rotate at a predetermined first rotation angular velocity from the calibration starting point to the calibration ending point, after the speaker rotates to the calibration ending point, updating the calibration ending point to the calibration starting point, and updating the calibration starting point to the calibration ending point;

controlling the speaker to rotate from the updated calibration starting point to the updated calibration ending point at a predetermined second rotation angular velocity, wherein the first rotation angular velocity is greater than the second rotation angular velocity; and during the rotation process of the speaker, collecting the actual rotation angle value and the mapping IMU data corresponding to the actual rotation angle value of the speaker every preset rotation angle.

7. The calibration control method for the speaker according to claim 3, wherein:

a calibration reference point is provided within a rotation angle range between the calibration starting point and the calibration ending point, and an actual rotation angle value of the speaker rotating from the calibration starting point to the calibration reference point is configured to be the reference rotation angle value; and before the collecting the actual rotation angle value of the speaker, the method comprises:

based on a proximity sensor in the speaker, detecting whether the speaker is rotated to the calibration reference point; and in response to the speaker being rotated to the calibration reference point, configuring the reference rotation angle value as the actual rotation angle value of the speaker.

8. A calibration control device for a speaker, comprising: a memory, a processor, and a calibration control program stored in the memory and executable on the processor, when the calibration control program is executed by the processor, the calibration control method for the speaker according to claim 1 is implemented.

9. A non-transitory computer-readable storage medium, wherein a calibration control program is stored on the non-transitory computer-readable storage medium, and when the calibration control program is executed by a processor, the calibration control method for the speaker according to claim 1 is implemented.

10. A calibration control apparatus for a speaker, comprising:

a collection module, configured to obtain real-time inertial measurement unit (IMU) data of the speaker, and determine whether the speaker is subject to an external force interference according to the real-time IMU data;

an analysis module, configured to in response to determining that the speaker is subject to the external force interference, detect whether an intensity value corresponding to the external force interference is greater than a preset intensity threshold; and a calibration module, configured to in response to the intensity value being greater than the preset intensity threshold, perform a rotation calibration operation on an IMU module in the speaker.

* * * * *